C. S. Dole. Sheet 1. 2 Sheets.
Dumping Wagon.
No. 85,573. Patented Jan. 5, 1869.

Witnesses
W. E. Marrs
H. S. Crane

Inventor
C. S. Dole
by
Columb A Marrs

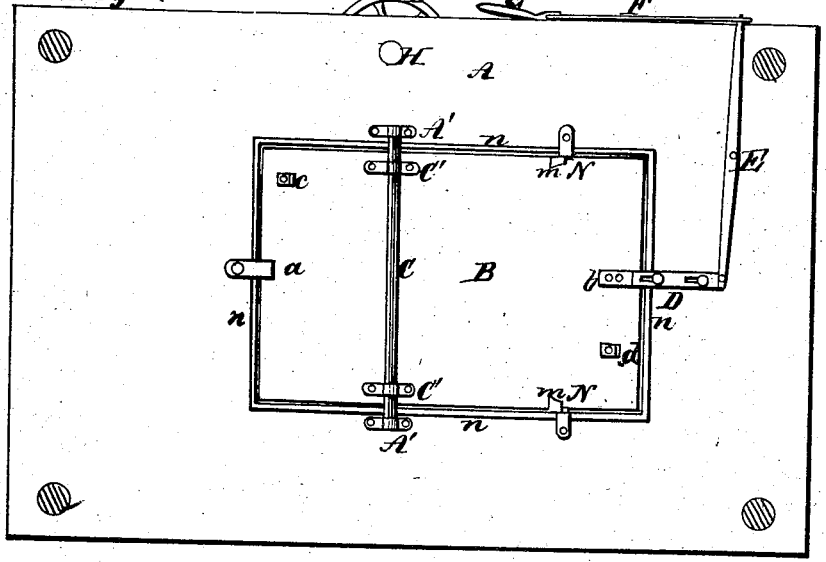
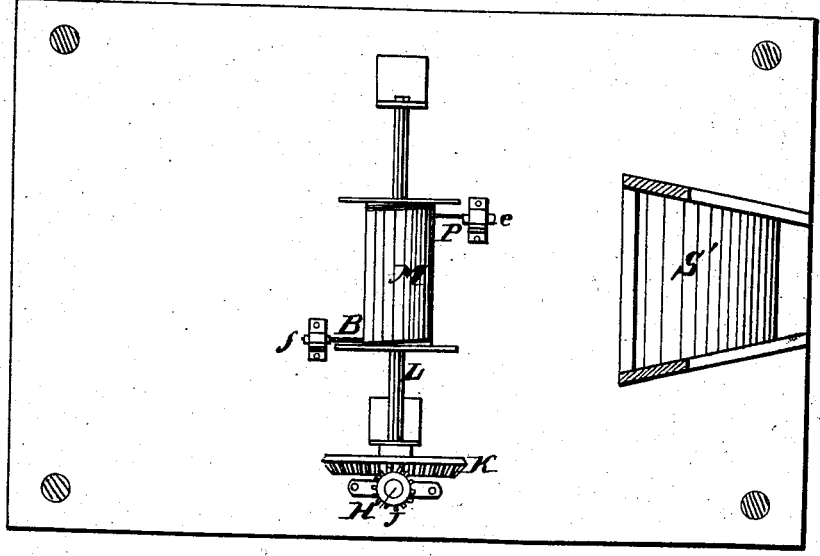

United States Patent Office.

CHARLES S. DOLE OF CHICAGO, ILLINOIS.

*Letters Patent No. 85,573, dated January 5, 1869.*

---

APPARATUS FOR UNLOADING GRAIN FROM WAGONS.

---

The Schedule referred to in these Letters Patent and making part of the same.

---

*To all whom it may concern:*

Be it known that I, CHARLES S. DOLE, of Chicago, in the county of Cook, and State of Illinois, have invented a new and useful Apparatus for Unloading Grain from Wagons; and I do hereby declare and make known that the following is a full, clear, and exact description of the same, reference being had to the accompanying drawings, and the letters and figures marked thereon, which form part of this specification.

My said invention is mainly designed for use in unloading ears of corn, potatoes, and such grain as is brought in in wagons or sleighs in bulk; and It consists in having a platform constructed in any suitable position, and on a higher level than the receptacle into which the corn or other produce is to be discharged from the wagon, said platform being provided with a movable trap, upon which either the entire wagon or sleigh, or only the rear wheels of the wagon may be driven and placed, so that by depressing the said movable trap, in the latter case, or causing it to assume a position inclining downwards toward the rear, the contents of the wagon or sleigh, by raising the rear end-board, can be readily precipitated into the appropriate receptacle or bin, whence it may be elevated and distributed at pleasure, as hereinafter more fully described.

To enable those skilled in the art to understand how to construct and use my said invention, I will proceed to describe the same with particularity, making reference in so doing to the aforesaid drawings, in which—

Figure 3 is a bottom plan view of the platform and trap, and their attachments; and Figure 4 is a plan of the lower floor, and of the bin or chute, with the appliances for operating the trap.

Similar letters of reference in the several figures denote the same parts of my said apparatus.

Figure 1:
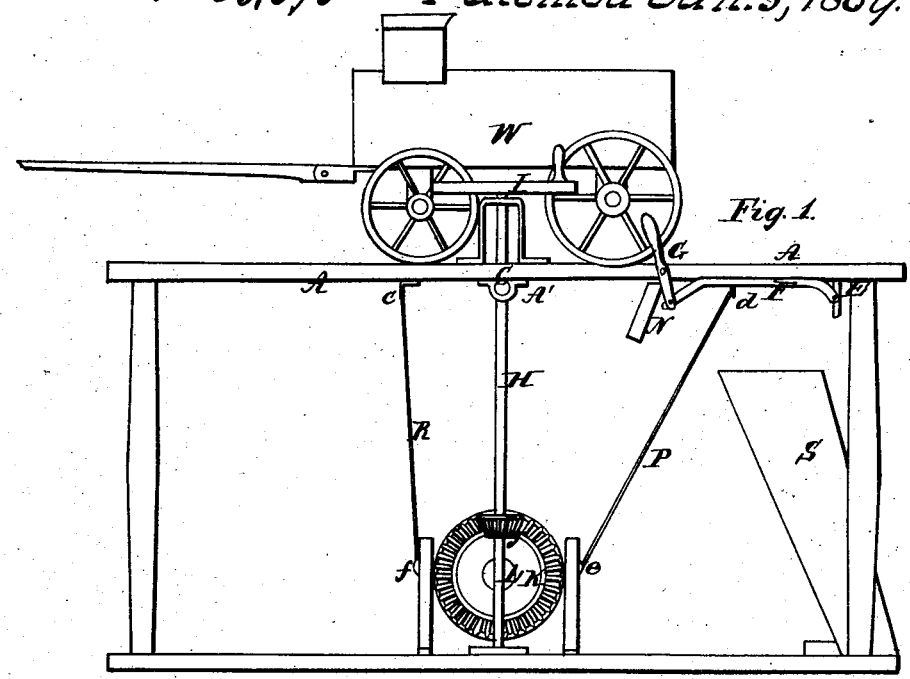
Figure 1 represents a side elevation of my invention.

A represents a stationary platform, supported in any suitable manner, and having suitable approaches, so that wagons or sleighs can readily be driven upon the same, being more or less elevated from the ground, according to the position of the bin or receptacle into which the grain or produce is to be unloaded.

B represents a movable trap, of suitable size and form, large enough to receive a wagon which is suspended upon an axle or shaft, C, passing across and beneath it, a little to one side of the centre, longitudinally, to which trap said axle is firmly secured by the metallic straps C' C', as shown in the drawings.

Figure 2:
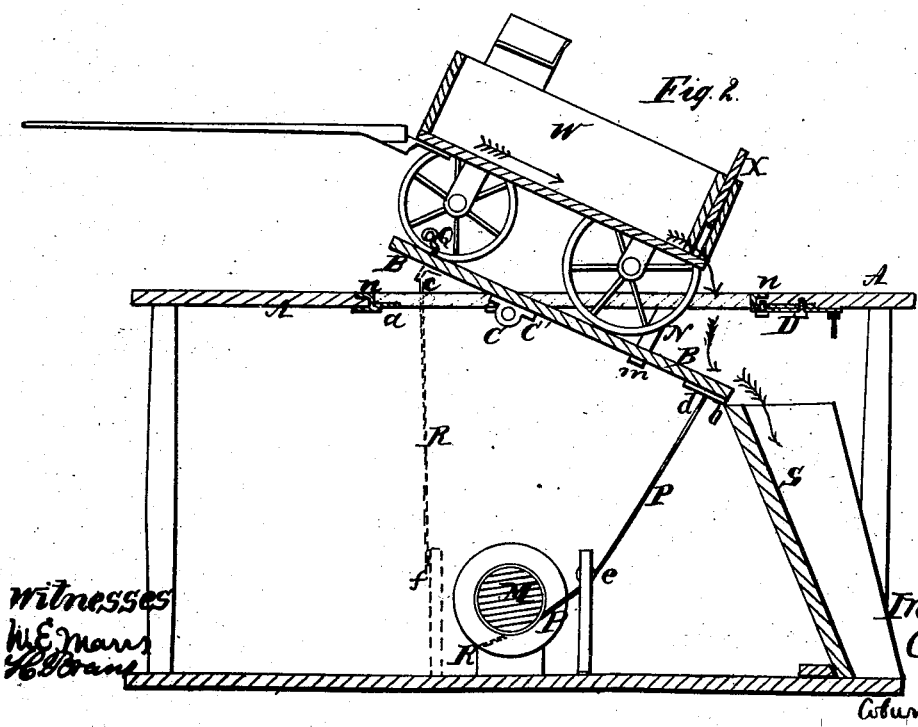
Figure 2 is a vertical section, showing the same in position for discharging the grain.

The ends of said shafts C form journals or trunnions, upon which said trap may turn or tip, as indicated in fig. 2, said journals being supported in suitable boxes or bearings A', as shown in the drawings.

The said trap B fits neatly into an opening made to receive it in the platform A, which opening may be lined or faced with metal, as seen at n, if desired, to prevent its being worn by the movement of the trap, at each end of which supports are projected from the opening to receive the trap, and sustain the same.

The support a is stationary, but the support D is secured to the under side of the platform by slotted supports, or by supports passing through slots in the bar, to admit of a sliding movement to said bar or support, so that it may be withdrawn from under the end of the trap, when it is desired to tip the platform.

The levers E F G are connected, as shown, with said bar D, so that the operator, by moving the lever G, can withdraw or replace the support D, with reference to the trap B, as desired.

At the point beneath the end of the said trap, where the catch D slides, a plate, b, is attached to the trap, to prevent the wearing of the trap by the friction.

Below the rear end of the trap the bin S is located, or said bin may be located at a distance, and the grain may be discharged into a chute, which conducts it to the bin.

Upon a floor or frame beneath the platform A or the trap B, parallel with and under the shaft C, is a shaft, L, supported in suitable bearings, as shown, said shaft being provided with a drum, M, and also, upon one end, with a bevelled gear-wheel, K, which latter engages with the bevelled pinion J, upon the vertical shaft H, which passes up through the platform A, and is provided with a wheel, I, as shown, whereby said shafts I and L can be revolved by the operator standing upon the platform A.

To the said drum M is attached one end of a cord or chain, R, the opposite end of said cord or chain being attached to a point at c, near the forward end of the trap B, as shown.

A second cord or chain, P, is also attached to said drum M, passing in the opposite direction, to be attached at d to a point near the rear end of said trap B, both of said cords passing respectively under pulleys or sheaves e f, as shown, and being of such length that when one commences to wind upon said drum, by the revolving thereof, the other immediately unwinds.

In describing the operation of the above-specified apparatus, we will assume the trap to be in a horizontal position, forming part of the platform, supported at each end by the projection a and the sliding bar D.

The wagon containing the ears of corn, potatoes, or other produce in bulk, is then driven upon said trap, and properly secured thereto by clamping the fore wheels thereto by any suitable means, as indicated at Q in fig. 2.

The rear end-board, X, is then raised up, as indicated in said fig. 2, and the catch D withdrawn from beneath the rear end of the trap, by moving the lever G back, when the operator turns the wheel I, on the shaft H, in that direction, which will wind the cord P upon the drum M, and unwind the cord R therefrom, until the trap is brought to the position shown in fig.

2, its rear end resting upon suitable rests, marked N, which are secured to the under side of the platform A, as indicated in the drawings, when the contents of the wagon-body W slide out at the rear end, as indicated by the arrows, and pass into the bin or chute S, as desired.

When the wagon or sleigh is unloaded, by turning the wheel I in the reverse direction, the trap B is restored to its original position, and the catch D moved under it rear end, when the wagon is released, and moves off to give place to another, when the operation is repeated.

It will be observed that the oscillating trap B is pivoted at one side of the central line between the ends, so that while the weight of the wagon is nearly balanced upon the supports A' A', there is a preponderance behind, so as to facilitate the descent of the rear end of the trap, making it necessary to have but a slight power or force to operate the apparatus, either in lowering or raising the trap.

If desired, a brake may be applied to the shaft L to prevent the too rapid descent of the trap, in case the distance from the centre of the trap to the supporting-points should render the preponderance of the weight at the rear end of the trap so great as to cause a too rapid precipitation of the trap without the application of a brake.

Instead of the particular mechanical appliances herein shown for operating the oscillating trap B, any other suitable means may be employed, the advantage of having the trap supported at or about midway from each end being to enable the apparatus to be operated with very little power, or by hand.

It may be observed, furthermore, that when it is desired to unload, by simply placing the rear end or wheels of the wagon upon the trap, leaving the forward wheels resting upon the stationary platform, the said trap may be so suspended or supported as to have a perpendicular descent and ascent in a horizontal position, as the rear end of the wagon would thereby be lowered so as to cause the contents of the wagon to discharge, as above specified. In such case, any suitable mechanical means may be employed for suspending or sustaining said trap, and for imparting to it the requisite motions, in operating the apparatus, to discharge or unload wagons, and restore the same to their original position after they are unloaded, as aforesaid.

When the trap is constructed and arranged so as to move vertically, it is obvious that the stop $a$ must be constructed so as to move back when desired, the same as the slide D.

Having described the nature, construction, and operation of my invention, I will now specify what I claim as new, and desire to secure by Letters Patent.

1. I claim, in combination with a platform, A, and a movable trap, B, operating as described, a stationary or movable stop, $a$, and a slide, D, arranged substantially as and for the purposes specified.

2. I claim, in combination with the pivoted trap B, a drum, M, and cords R P, arranged to operate in the manner set forth and specified.

3. I claim the combination of the swinging trap B, cords R P, drum M, gearing J K, and shaft H, arranged to operate as set forth.

4. I claim, in combination with the platform A and trap B, the sliding catch D and levers E F G, arranged as and for the purposes shown and specified.

5. I claim the arrangement of the rests N, having horizontal lips, $m$, to support the trap B, as shown and described.

CHAS. S. DOLE.

Witnesses:
L. E. CONGEN,
THOS. W. BEERS.